United States Patent
Takahashi et al.

(10) Patent No.: US 8,412,940 B2
(45) Date of Patent: Apr. 2, 2013

(54) BIOMETRIC AUTHENTICATION METHOD AND SYSTEM

(75) Inventors: Kenta Takahashi, Kamakura (JP); Shinji Hirata, Chigasaki (JP); Yoshiaki Isobe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 13/057,468

(22) PCT Filed: Aug. 21, 2009

(86) PCT No.: PCT/JP2009/004022
§ 371 (c)(1),
(2), (4) Date: Apr. 12, 2011

(87) PCT Pub. No.: WO2010/050104
PCT Pub. Date: May 6, 2010

(65) Prior Publication Data
US 2011/0185176 A1    Jul. 28, 2011

(30) Foreign Application Priority Data
Oct. 31, 2008 (JP) ................. 2008-281588

(51) Int. Cl.
*H04L 29/06* (2006.01)
(52) U.S. Cl. .............. 713/168; 713/186; 382/115
(58) Field of Classification Search ............ 713/168, 713/186; 726/2; 382/2, 6, 9, 30, 115–124; 380/44
See application file for complete search history.

(56) References Cited

U.S. PATENT DOCUMENTS

| | | | | |
|---|---|---|---|---|
| 5,291,560 A * | 3/1994 | Daugman | .............. | 382/117 |
| 7,225,338 B2 * | 5/2007 | Khan et al. | .............. | 713/186 |
| 2003/0217276 A1 * | 11/2003 | LaCous | .............. | 713/186 |
| 2006/0050937 A1 * | 3/2006 | Hamid | .............. | 382/124 |

(Continued)

FOREIGN PATENT DOCUMENTS

| | | | |
|---|---|---|---|
| EP | 1933281 A2 * | 6/2008 | |
| JP | P3307936 | 5/2002 | |

(Continued)

OTHER PUBLICATIONS

Wu, Zhengping, et al., "Alignment of Authentication Information for Trust Federation", Oct. 15-16, 2007 Eleventh International IEEE EDOC Conference, p. 73-80.*

(Continued)

*Primary Examiner* — Farid Homayounmehr
*Assistant Examiner* — Maung Lwin

(74) *Attorney, Agent, or Firm* — Foley & Lardner LLP

(57) ABSTRACT

At registration time, feature data array for registration is generated from biometric information, and position correction template and comparison template. At authentication time, feature data array for authentication is generated from biometric information acquired by the client, and converted feature data for position correction obtained by converting the feature data array for authentication is transmitted to the server. The server detects position correction amount of the feature data array for authentication relative to the feature data array for registration using the position correction template and the converted feature data, and transmits the position correction amount to client. Client corrects the feature data array for authentication and transmits the converted feature data array for comparison to the server. Server calculates a distance between the comparison template and the converted feature data array for comparison and determines success or failure of the authentication on the basis of the distance.

18 Claims, 10 Drawing Sheets

U.S. PATENT DOCUMENTS

| | | | |
|---|---|---|---|
| 2006/0056662 A1* | 3/2006 | Thieme et al. | 382/115 |
| 2007/0100622 A1* | 5/2007 | Tavares | 704/250 |
| 2007/0230753 A1* | 10/2007 | Kitane et al. | 382/124 |
| 2007/0266427 A1* | 11/2007 | Kevenaar et al. | 726/5 |
| 2008/0037833 A1* | 2/2008 | Takahashi et al. | 382/115 |
| 2008/0072063 A1* | 3/2008 | Takahashi et al. | 713/186 |
| 2008/0178002 A1* | 7/2008 | Hirata et al. | 713/168 |
| 2008/0178008 A1* | 7/2008 | Takahashi et al. | 713/186 |
| 2010/0202669 A1* | 8/2010 | Hollingsworth et al. | 382/117 |

FOREIGN PATENT DOCUMENTS

| | | |
|---|---|---|
| JP | 2005-209018 | 8/2005 |
| JP | 2006-158851 | 6/2006 |
| JP | 2007-293807 | 11/2007 |
| WO | WO 97/08868 * | 3/1997 |
| WO | WO 2007069146 A2 * | 6/2007 |

OTHER PUBLICATIONS

Linnartz, Jean-Paul, et al., "New Shielding Funstions to Enhance Privacy and Prevent Misuse of Biometric Templates", Jun. 9-11, 2003, 4th International Conference on Audio and Video Based Biometric Person Authentication, UK, 7—pages.*

John Dougman, "How Iris Recognition Works", IEEE Transactions on Circuits and Systems for Video Technology, vol. 14, No. 1, Jan. 2004, pp. 21-30.

* cited by examiner

BIOMETRIC AUTHENTICATION METHOD AND SYSTEM

INCORPORATION BY REFERENCE

This application claims the priority of Japanese Patent Application No. 281588 (Japanese Patent Application No. 2008-281588), filed on Oct. 31, 2008, the contents of which are incorporated herein by reference.

TECHNICAL FIELD

The present invention relates to a method and system for biometric authentication that authenticate a person using biometric information of the person.

BACKGROUND ART

In a personal authentication system using biometric information, biometric information of a person is acquired at the registration time, and information called feature data is extracted from the biometric information and then registered. The registered information is called a template. At the authentication time, biometric information is acquired from the person again, and feature data is extracted from the biometric information. The feature data is compared with the previously registered template to determine the identity of the person.

Assume that, in a system where a client and a server are coupled via a network, the server biometrically authenticates the user who is adjacent to the client. In this case, the server typically holds a template. At the authentication time, the client acquires biometric information of the user, extracts feature data from the biometric information, and transmits the feature data to the server. The server compares the feature data with the template to determine the identity of the user.

However, a template is information by which a person can be identified and therefore must be strictly managed as personal information, requiring high management cost. Further, there are many people who have inhibitions in registering a template in terms of privacy even if the template is strictly managed. Further, since the number of pieces of a single type of biometric information possessed by a single person is limited (for example, only ten fingers have fingerprints), the template cannot be easily changed, unlike a password or cipher key. If a template is leaked and may be counterfeited, a problem occurs that biometric authentication using the template cannot be used. Further, if the same biometric information is registered in a different system, the different system is also placed under danger.

For these reasons, there has been proposed the following method (called cancellable biometric authentication). That is, at the biometric information registration time, the client converts feature data using a given function (a kind of encryption) and a secret parameter (a kind of encryption key) possessed by the client and stores the converted feature data as a template in the server with the original information concealed. At the authentication time, the client newly extracts feature data of biometric information, converts the feature data using the same function and parameter, and transmits the converted feature data to the server, and the server receives the feature data and compares the feature data with the template with the feature data and the template converted.

According to this method, the client holds the conversion parameter secretly, sc the server cannot recognize the original feature data even at the authentication time, thereby protecting personal privacy. Even when the template is leaked, security can be maintained by changing the conversion parameter and generating and registering a template again. Further, in the case where the same biometric information is used in different systems, templates are converted using different parameters and registered, so leakage of one template can be prevent from reducing the security of the other systems.

The specific cancellable biometric authentication realization method depends on the type of biometric information or the comparison algorithm. Patent Document 1 describes a cancellable iris authentication realization method.

Patent Document 2 describes a realization method (hereafter referred to as correlation-constant random filtering) that is applicable to biometric authentication technology that, in the case where the feature data is an image, particularly, data represented by a two-dimensional array of luminance values (integers), determines whether two images are matched or not, on the basis of the maximum correlation value taking into account the mismatch between the two images.

Patent Document 3 and Non-Patent Document 1 disclose: the feature data (iris code) in iris authentication cannot be represented by only a simple bit string; a mask pattern is needed for representing a portion from which an iris pattern cannot be extracted at the time of imaging, such as an eyelid or a portion that reflects light; and in comparing two iris codes, the Hamming distance is not simply calculated but repeatedly calculated while one of the iris codes is cyclically shifted little by little, and the smallest value (the minimum Hamming distance) is compared with a threshold to determine whether the two iris codes are matched or not.

PRIOR ART DOCUMENTS

Patent Documents

[Patent Document 1] JP-A-2005-209018
[Patent Document 2] JP-A-2007-293807
[Patent Document 3] Japanese Patent No. 3307936

Non-Patent Documents

[Non-Patent Document 1] J. Daugman, "How Iris Recognition Works", IEEE TRANSACTIONS ON CIRCUITS AND SYSTEMS FOR VIDEO TECHNOLOGY, VOL. 14, NO. 1, JANUARY 2004.

SUMMARY OF THE INVENTION

Problems to be Solved by the Invention

The above-mentioned Patent Document 1 discloses a method for generating a parametric conversion $f(X, R)$ so that the Hamming distance (HD, the number of unmatched bits) between codes $X1$ and $X2$ each composed of any n bits is constant. That is, the following holds true for any parameter R.

$$HD(X1,X2)=HD(f(X1,R),f(X2,R))$$

Specifically, a random code determined by R is bit-concatenated to the code X (bit concatenation step), a random pattern determined by R is substituted for a bit position of the code X (bit substitution step), and the exclusive OR between the code X and the random code determined by R is obtained (exclusive OR step). While Patent Document 1 discloses that the above-mentioned exclusive OR step is replaced with a "rotation" process, the rotation process is equivalent to a combination of the bit substitution step and the exclusive OR step.

However, formation of cancellable iris authentication using the above-mentioned conversion function f has the following problems.

As described above, in Patent Document 3 and Non-Patent Document 1, the feature data (iris code) in iris authentication cannot be represented by only a simple bit string and requires a mask pattern representing a portion from which an iris pattern cannot be extracted at the time of imaging, such as an eyelid or a portion that reflects light. In other words, the feature data must be represented not by a binary bit string composed of $\{0, 1\}$ but by a ternary bit string composed of $\{0, 1, *\}$. "*" is a value representing a portion from which an iris pattern cannot be extracted and is a special bit considered to match any of 0 and 1 in calculating the Hamming distance (hereafter referred to as a "Don't care bit"). Patent Document 1 does not take into account the existence of a Don't care bit.

According to Patent Document 3 and Non-Patent Document 1, in comparing two iris codes, the Hamming distance is not simply calculated but repeatedly calculated while one of the iris codes is cyclically shifted little by little, and the smallest value (the minimum Hamming distance) is compared with a threshold so as to determine whether the two iris codes are matched or not. The cyclic shift of the iris code corresponds to the rotational conversion of the original iris image. This operation accommodates the rotational displacement of iris at the time of imaging, caused by a change in posture of the user, etc. Patent Document 1 does not take into account such a shift operation and thus, conceivably, can make a correct comparison only when no rotational displacement occurs, degrading authentication accuracy significantly.

Further, a code to be bit-concatenated, of the above-mentioned conversion function f is decisively determined by R and is not changed each time authentication is performed. On the other hand, the original iris code can be changed by a displacement or noise each time authentication is performed. Thus, by recording the converted bit string each time authentication is performed and comparing the recorded bit strings, the position of a bit that is not changed regardless of how many times authentication is performed is recognized to be a position where the concatenation bit has been substituted. Thus, bit concatenation does not contribute to an improvement in security in terms of the concealment of an iris code.

On the other hand, Patent Document 2 discloses a method of comparing feature data images (two-dimensional arrays) $X1(i, j)$ and $X2(i, j)$ with a correlation function (correlation image) thereof described below with X1 and X2 themselves concealed.

$$C(i,j)=X1(i,j)*X2(i,j)=\Sigma k \Sigma l X1(k,l)X2(k-i,l-j) \quad (1)$$

This is a method of calculating $C=X1*X2$ by convoluting a randomly generated certain reversible filter R into X1 so as to conceal X1, convoluting the inverse filter of R, R', into an image obtained by inverting X2 so as to conceal X2, and convoluting the concealed two images. More specifically, the feature data images are concealed by subjecting them to basis transform (Fourier transform or number theoretic transform) and then multiplying (at the registration time) or dividing (at the authentication time) each element by a random value determined by a parameter. At the time of comparison, a correlation image can be correctly calculated by multiplying the converted images for each element and performing inverse basis transform. A correlation image $C(i, j)$ is a two-dimensional array formed by calculating inner products while displacing (cyclically shifting) X2 relative to X1 by $(i, j)$ and by arranging the calculated values. Whether X1 and X2 are matched or not can be determined by comparing the maximum value of $C(i, j)$ within the range of a predetermined maximum allowable displacement amount $(\Delta W, \Delta H)$, with a predetermined threshold.

The method described in the above-mentioned Patent Document 2 can be easily applied also to a one-dimensional-array feature data (iris code, etc.) and thus can provide a solution to the problem that cyclical shift must be taken into account, which is one of the problems with the above-mentioned Patent Document 1. However, the method of Patent Document 2 is a method of calculating the correlation value between the feature data arrays. For this reason, application of this method to biometric authentication where determination should originally be made on the basis of Hamming taking into account a Don't care bit, such as the iris authentication described in Patent Document 3 and Non-Patent Document 1, causes the deterioration of authentication accuracy.

Accordingly, an object of the present invention is to provide a method and system for cancelable biometric authentication with less accuracy deterioration and a high level of security (the confidentiality of feature data), to a method and system for biometric authentication where feature data are represented by a one-dimensional array (bit string) or two-dimensional array (image) including a Don't care bit and where the distance between the feature data is defined by the minimum Hamming distance taking into account a shift (displacement).

Means for Solving the Problems

The present invention is a method and system for biometric authentication according to the following aspect. At a biometric information registration time, a client extracts a feature data array for registration from biometric information of a registration applicant, generates a first conversion parameter for comparison to be used to convert the feature data array for registration, generates a position correction template from the feature data array for registration, generates a comparison template by converting the feature data array for registration using the first conversion parameter for comparison, and transmits the position correction template and the comparison template to a server. At an authentication time, a feature data array for authentication is extracted from biometric information of a user, a second conversion parameter for comparison to be used to convert the feature data array for authentication is generated, a converted feature data for position correction is generated from the feature data array for authentication, and the converted feature data for position correction is transmitted to the server. The server stores the position correction template and the comparison template in a database coupled to the server, calculates the position correction amount between the feature data array for registration and the feature data array for authentication using the position correction template and the converted feature data for position correction by transmitted by the client, and transmits the position correction amount to the client. The client also generates a corrected feature data array by performing position correction on the feature data array for authentication on the basis of the position correction amount, generates a converted feature data array for comparison by converting the corrected feature data array using the second conversion parameter for comparison, and transmits the converted feature data array for comparison to the server. The server calculates the distance between the comparison template stored in the database and the converted feature data array for comparison transmitted by the client and determines success or failure of authentication of the user as the registration applicant on the basis of comparison between the distance and a predetermined authentication threshold.

According to another preferred aspect of the present invention, the registration feature data array and the authentication feature data array are each a bit string having a predetermined size L. The generation of the first conversion parameter for comparison includes randomly generating a mask bit string having the size L. The first conversion parameter for comparison includes the mask bit string. The comparison template is an array obtained by calculating the exclusive OR between the registration feature data array and the mask bit string. The converted feature data array for comparison is an array obtained by calculating the exclusive OR between the corrected feature data array and the mask bit string. A Hamming distance is used as the distance.

According to another preferred aspect of the present invention, the feature data array for registration and the feature data array for authentication are each a bit string having the predetermined size L. The generation of the first conversion parameter for comparison includes: randomly generating a concatenation array having a size M; and generating a substitution pattern to be used to substitute positions of elements of an array for each other, the array having a size of the sum of L and M. The generation of the comparison template includes: generating a concatenation array for registration having a size of the sum of L and M by concatenating the feature data array for registration and the concatenation array; and generating a comparison template by converting the concatenation array for registration in accordance with the substitution pattern. The generation of converted feature data array for comparison includes: generating a modified concatenation array that is distant from the concatenation array by a predetermined offset Hamming distance δ and has the size M; generating a concatenation array for authentication having a size of the sum of L and M by concatenating the feature data array for authentication and the modified concatenation array; and generating a converted feature data array for comparison by substituting the concatenation array for authentication in accordance with the substitution pattern. The calculation of the distance between the comparison template and the converted feature data array for comparison is calculation of a corrected Hamming distance (d−δ) by subtracting the offset Hamming distance δ from the Hamming distance d between the comparison template and the converted feature data array for comparison. The distance for the determination of the success or failure of authentication is the corrected Hamming distance.

According to another aspect of the present invention, the generation of the position correction template includes: generating a local feature data array for registration by cutting a part of the feature data array for registration. The generation of the converted feature data for position correction includes generating a partial feature data array for authentication by cutting a part of the feature data array for authentication. In the calculation of the position correction amount, a distance is calculated while the partial feature data array for authentication is repeatedly shifted relative to the local feature data array for registration, and a shift amount with which the distance is minimized is defined as the position correction amount. In the generation of the corrected feature data array, the feature data array for authentication is shifted by the position correction amount.

According to another preferred embodiment of the present invention, a conversion parameter for position correction to be used to convert the feature data array for registration is generated at a biometric information registration time. The generation of the position correction template includes: cutting a local feature data array for registration from the feature data array for registration; and generating the position correction template by converting the local feature data array for registration using the conversion parameter for position correction. The generation of the converted feature data for position correction includes: cutting a partial feature data array for authentication from the feature data array for authentication; and generating the converted feature data for position correction by converting the partial feature data array for authentication using the conversion parameter for position correction.

According to another preferred embodiment of the present invention, a client for registering biometric information differs from a client for authentication.

Effect of the Invention

According to the present invention, it is possible to realize biometric authentication with less accuracy deterioration and a high level of security (the confidentiality of the feature data) while concealing the feature data from the server.

MODE FOR CARRYING OUT THE INVENTION

Hereafter, an embodiment of the present invention will be described with reference to the drawings. This embodiment will be described using, as an example, a server/client-type cancelable biometric authentication system where the client converts feature data of biometric information and transmits the converted feature data to the server and where the server makes comparison without recognizing the original feature data.

Figure 1:
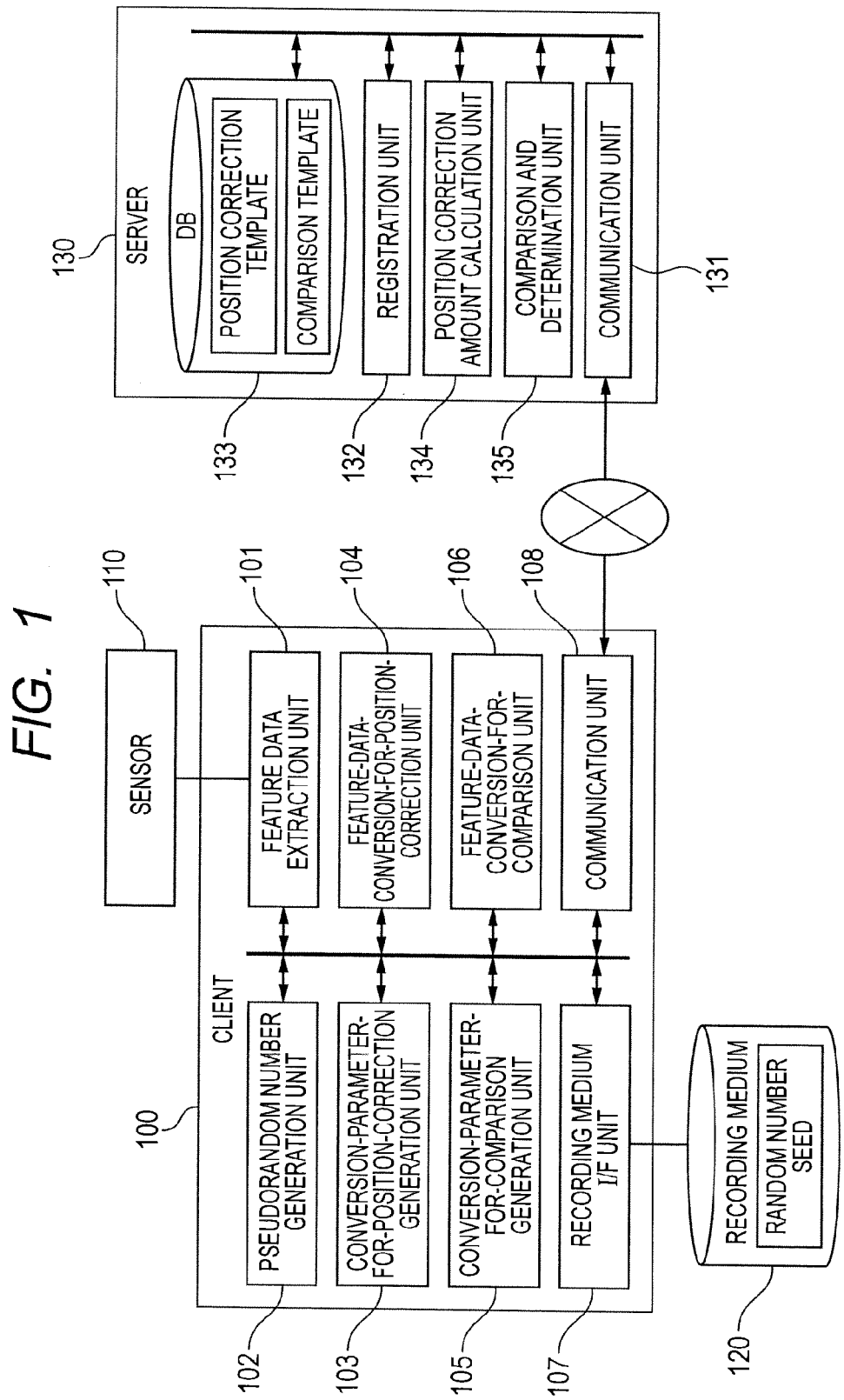
FIG. 1 A diagram showing an example configuration of a cancelable biometric authentication system.

FIG. 1 shows an example configuration of a cancelable biometric authentication system.

A cancelable biometric authentication system according to this embodiment is constructed by coupling a client terminal (hereafter referred to as the "client") 100 and an authentication server (hereafter referred to as the "server") 130 via a network such as the Internet or an intranet. At the registration and authentication times, the client 100 acquires biometric information, extracts feature data, and converts the feature data. The server 130 holds templates and makes comparison.

The client 100 is managed by the user himself/herself or a reliable third party, includes a sensor 110, which acquires biometric information (for example, iris, fingerprint, vein, etc.), and reads or writes data from or to a recording medium 120. The recording medium 120 may be a portable recording medium managed by the user, such as an IC card or USB memory, or may be a recording medium coupled to the client in a fixed manner, such as a hard disk. For example, in the case where Internet banking is performed from home, a configuration may be used where the client 100 is a home PC managed by the user and where the server 130 is a server machine managed by the bank. This example Internet banking system may have a configuration where the home PC of the user is used as an authentication client and where, for example, a teller terminal provided at the bank is used as a registration client. Hereafter, to simplify explanation, assuming that the client 100 is used to register and authenticate biometric information, explanation will be given.

The client 100 includes a feature data extraction unit 101, which extracts feature data of biometric information acquired from the sensor, a pseudorandom number generation unit 102, a conversion-parameter-for-position-correction generation unit 103, a feature-data-conversion-for-position-correction unit 104, a conversion-parameter-for-comparison generation unit 105, a feature-data-conversion-for-comparison unit 106, a recording medium I/F unit 107, and a communication unit 108, which communicates with the server.

Biometric information refers to data such as a fingerprint image, vein image, or iris image. Examples of feature data include an image (two-dimensional array) obtained by enhancing a fingerprint image or vein image and an iris code (one-dimensional array) generated using methods described in Patent Document 3 and Non-Patent Document 1. Values contained in a feature data array each take any one of the three values of $\{0, 1, *\}$ where "*" represents a Don't care bit. The distance between two feature data is given as the smallest value of the Hamming distances obtained by overlapping the two feature data while moving them little by little, taking into account a displacement (shift), or as a value obtained by normalizing the smallest value.

The server 130 includes a communication unit 131, which communicates with the client 100, a database 133, where templates are managed, a registration unit 132, which registers a position correction template and a comparison template acquired from the client in the database 133, a position correction amount calculation unit 134, which calculates a position correction amount for correcting the displacement between a registration feature data and an authentication feature data, and comparison and determination unit 135, which calculates the Hamming distance between the registration feature data and the displacement-corrected authentication feature data without recognizing the original feature data so as to determine match or mismatch.

Figure 2:
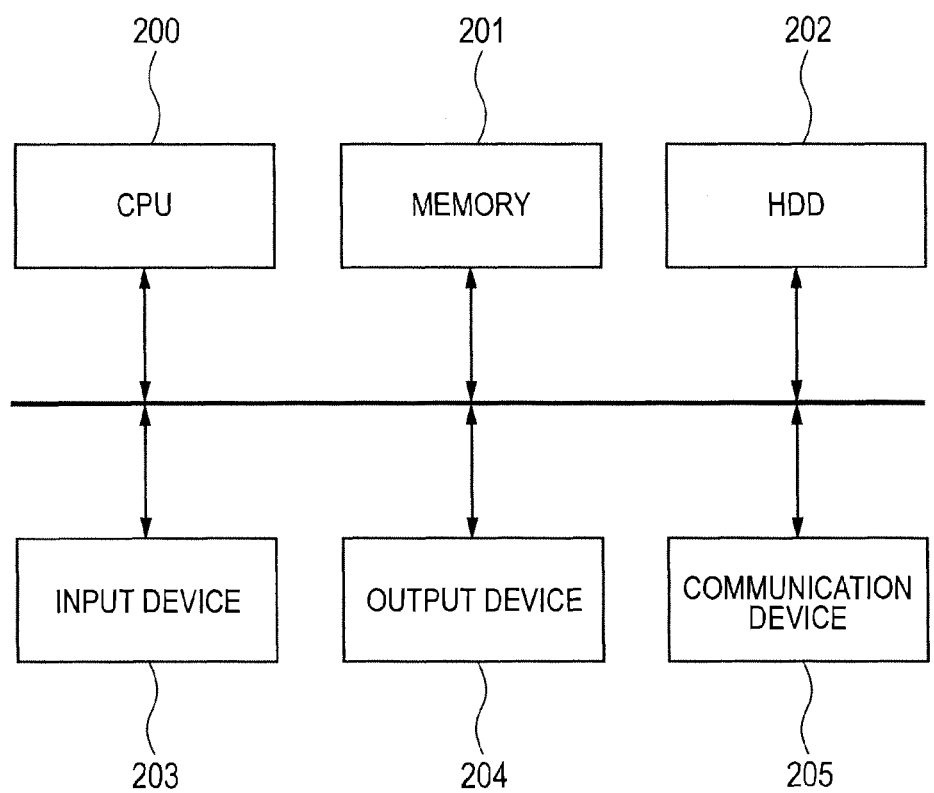
FIG. 2 A diagram showing the hardware configuration of a client and a server for realizing the cancelable biometric authentication system.

FIG. 2 shows an example hardware configuration of the client 100 and the server 130 that realize the cancelable biometric authentication system. As seen in the figure, the client 100 and the server 130 each can be formed by a CPU 200, a memory 201, an HDD 202, an input device 203, an output device 204, and a communication device 205. In any of the client 100 and the server 130, programs and various types of data corresponding to the processing units shown in FIG. 1 are stored in the memory 201 or HUD 202. These programs are executed by the CPU 200, realizing the biometric authentication system according to this embodiment. The input device 203 or the output device 204 is used by the user or the administrator of the server, as necessary. The communication device 205 is coupled to a network.

Figure 3:
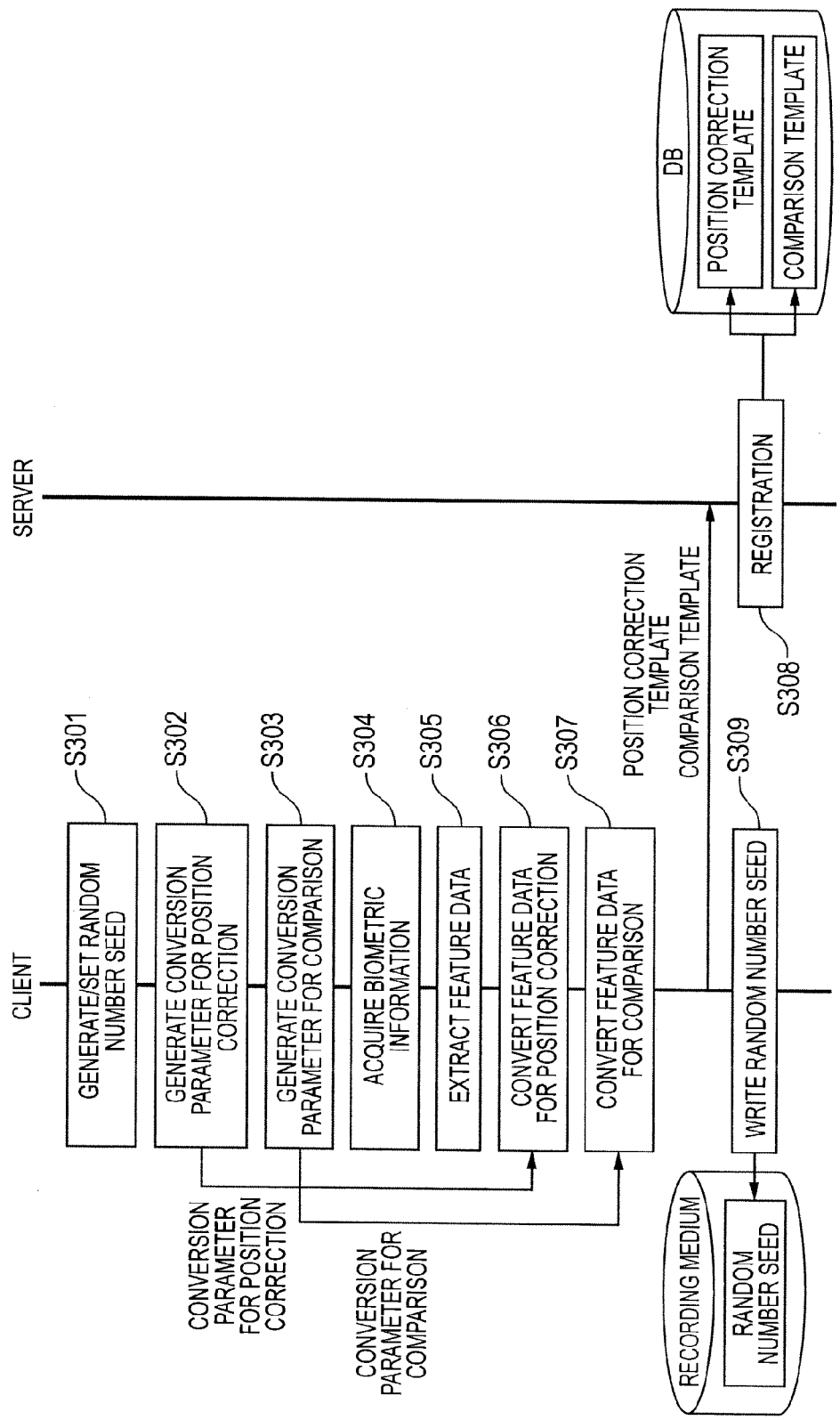
FIG. 3 A flowchart of a biometric information registration process.

FIG. 3 shows a flowchart of a biometric information registration process according to this embodiment. The pseudorandom number generation unit 102 of the client 100 generates a pseudorandom number using, as a seed, the time of day or random keyboard input by the operator and randomly generates a random number seed to be used to generate a pseudorandom number later. This random number seed is set as a seed of the pseudorandom number generation unit 102 (S301).

The conversion-parameter-for-position-correction generation unit 103 randomly generates a conversion parameter for position correction using the pseudorandom number generation unit 102 (S302). Details of the generation method will be described later.

The conversion-parameter-for-comparison generation unit 105 randomly generates a conversion parameter for comparison using the pseudorandom number generation unit 102 (S303). Details of the generation method will be described later.

The sensor 110 acquires biometric information of the user (registration applicant) (S304).

The feature data extraction unit 101 extracts a registration feature data from the acquired biometric information (S305). For example, the feature data is an image (two-dimensional array) having a size of W×H and is referred to as a feature data array for registration. As described above, the value of each element (pixel) is any one of $\{0, 1, *\}$.

The feature-data-conversion-for-position-correction unit 104 converts the registration feature data using the conversion parameter for position correction generated in S302 so as to generate a position correction template (S306). Details of the conversion method will be described later.

The feature-data-conversion-for-comparison unit 106 converts the registration feature data using the conversion parameter for comparison generated in S303 so as to generate a comparison template and transmits the position correction template and the comparison template to the server 130 (S307). Details of the conversion method will be described later.

The registration unit 132 of the server 130 receives the position correction template and the comparison template and registers them in the database 133 (S308).

The recording medium I/F unit 107 of the client 100 writes the random number seed set by the pseudorandom number generation unit 102 into the recording medium 120 (S309). The recording medium 120 is possessed and managed by the user.

A mask code and a concatenation code to be described later, and the like are also stored in the recording medium 120, and the various types of data and parameters generated within the client 100 at the registration time are deleted in advance. Thus, information related to biometric authentication can be prevented from leaking due to unauthorized access to the client 100. Further, if a configuration is used where the authentication client differs from the registration client, a mask code, a concatenation code, and the like must be stored in the recording medium 120.

Figure 4:
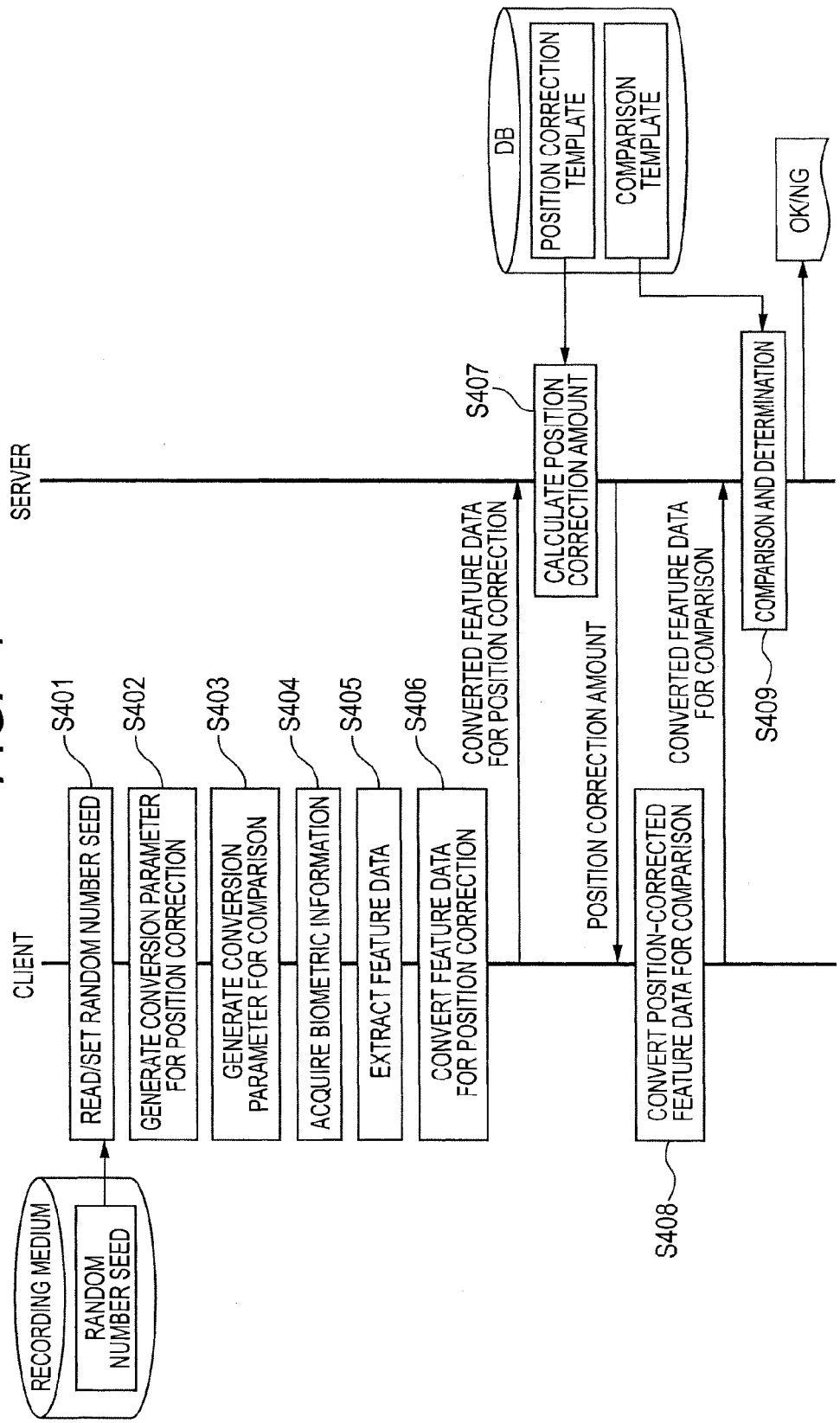
FIG. 4 A flowchart of a biometric information authentication process.

FIG. 4 shows a flowchart of biometric information authentication according to this embodiment.

The recording medium I/F unit 107 of the client 100 reads a random number seed from the recording medium 120 of the user and sets the random number seed as a seed of the pseudorandom number generation unit 102 (S401).

The conversion-parameter-for-position-correction generation unit 103 randomly generates a conversion parameter for position correction using the pseudorandom number generation unit 102 (S402).

The conversion-parameter-for-comparison generation unit 105 randomly generates a conversion parameter for comparison using the pseudorandom number generation unit 102 (S403). If the random number seed set in S401 is the same as the random number seed written in S309 of the registration flow, the pseudorandom number generation unit 102 outputs quite the same random number array. For this reason, the same conversion parameter for position correction is generated in both S302 and S402, and the same conversion parameter for comparison is generated in both S303 and S403.

The sensor 110 acquires biometric information of the user (user) (S404). The feature data extraction unit 101 extracts an authentication feature data (feature data array for authentication) from the acquired biometric information (S405).

The feature-data-conversion-for-position-correction unit 104 converts the authentication feature data using the conversion parameter for position correction generated in S402 so as to generate a converted feature data for position correction and transmits the generated converted feature data for position correction to the server 130 (S406). Details of the conversion method will be described later.

The position correction amount calculation unit 134 of the server 130 calculates a position correction amount between the registration feature data and the authentication feature data using the received converted feature data for position correction and the position correction template registered in the database 133, and transmits the calculated position correction amount to the client 100 (S407).

The feature-data-conversion-for-comparison unit 106 of the client 100 performs position correction on the authentication feature data using the received position correction amount, converts the position-corrected authentication feature data (referred to as the corrected feature data array) using the conversion parameter for comparison generated in S403 so as to generate a converted feature data for comparison, and transmits the converted feature data for comparison to the server 130 (S408).

The comparison and determination unit 135 of the server 130 calculates the Hamming distance between the received converted feature data for comparison and the comparison template registered in the database 133. If the Hamming distance falls below a predetermined threshold, the comparison and determination unit 135 determines that the authentication user (user) has been successfully authenticated as the registration user (registration applicant); otherwise, it determines that the authentication has failed (success/failure determination) (S409).

As seen, the server 130 can determine whether the original registration feature data and authentication feature data are matched or not, without recognizing them.

Hereafter, the flow of the feature data conversion for position correction and the flow of the feature data conversion for comparison at the registration and authentication times will be described. The feature data conversion for position correction is performed using, for example, a biometric feature data conversion method of Patent Document 2.

Figure 5:
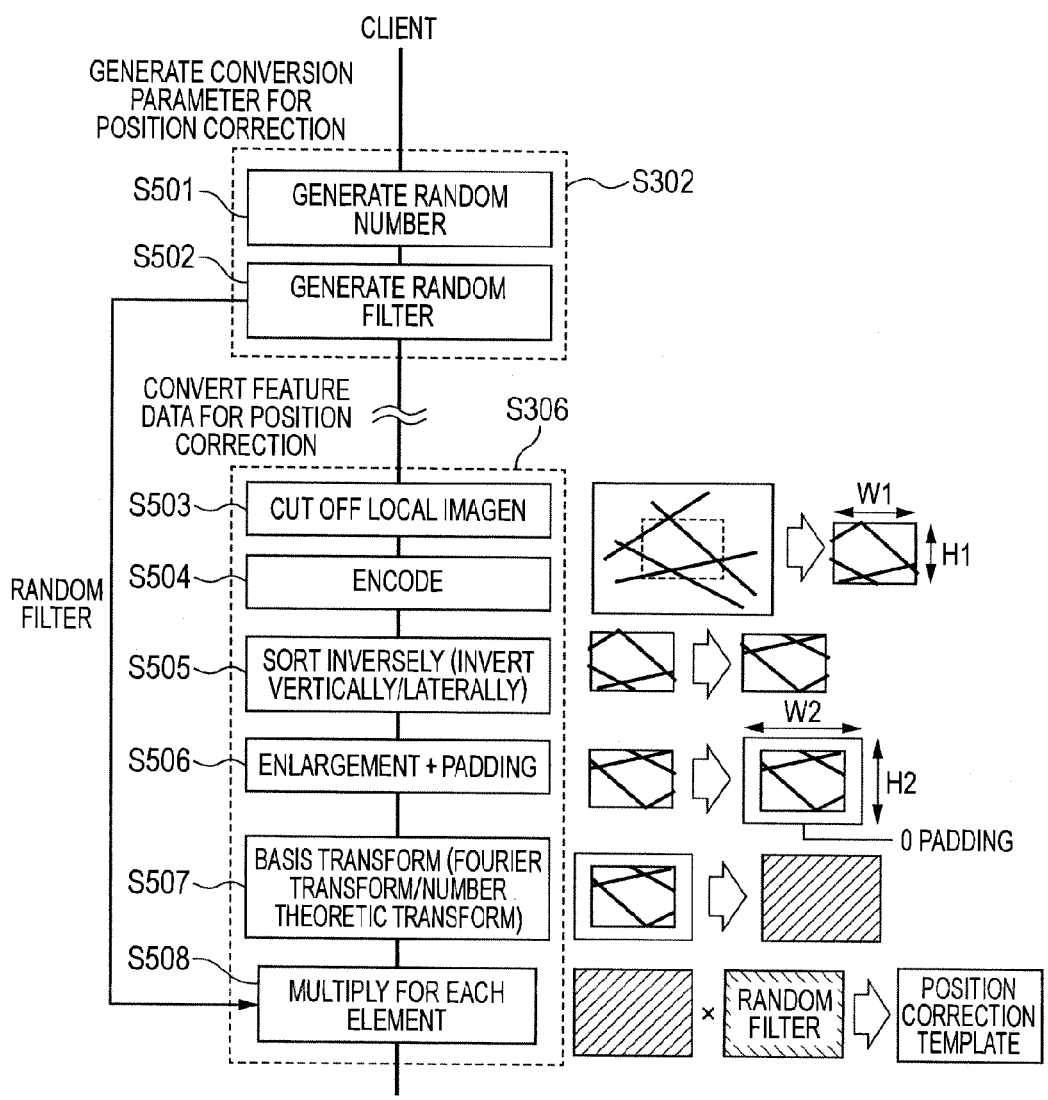
FIG. 5 Flowcharts of a conversion-parameter-for-position-correction generation process and a feature-data-conversion-for-position-correction process at the registration time.

FIG. 5 shows detailed flowcharts of the generation of a conversion parameter for position correction (S302) and the conversion of feature data for position correction (S306) at the registration time.

In the generation of a conversion parameter for position correction (S302), first, the pseudorandom number generation unit 102 generates a pseudorandom number array (S501).

Next, the conversion-parameter-for-position-correction generation unit 103 generates a random filter (S502). The random filter is a two-dimensional array having a size of W2×H2 and is generated so that the elements of the array have uniform random integral values within a predetermined range.

In the feature data conversion for position correction (S306), first, the feature-data-conversion-for-position-correction unit 104 cuts, from the center of the registration feature data image, a local image (local feature data array for registration) having a size of W1×H1 (W1<=W2 and H1<=H2 where <= indicates that a value on the left side is equal to or smaller than a value on the right side, the same goes for the later explanation) (S503). With respect to W1 and H1, if the allowable range of the position correction amount ($\Delta x$, $\Delta y$) to be used to overlap the registration and authentication feature data is $-\Delta W<=\Delta x<=\Delta W$ and $-\Delta H<=\Delta y<=\Delta H$, $W1=W2-2\times\Delta W$ and $H1=H2-2\times\Delta H$.

Next, the values of the pixels of the local image are encoded (digitized) in accordance with the following rule (S504). The encoded array (local image) is referred to as the encoded local feature data array for registration.

$$1 \rightarrow 1, 0 \rightarrow -1, * \rightarrow 0$$

The encoded local image is inverted vertically or horizontally (S505). Centering on the inverted image (size W1×H1), the size is enlarged to W2×H2, and the enlarged range is padded with zeros (S506). The enlarged and padded image is subjected to basis transform (Fourier transform or number theoretic transform) (S507).

The basis-transformed image and the random filter generated in S502 (both have a size of W2×H2) are multiplied for each corresponding pixel and defined as a position correction template (S508). Note that the multiplication is an operation between definitions in basis transform (complex number fields in Fourier transform, a prime field Z/pZ, etc. in number theoretic transform). Such multiplication using a random value for each element allows concealment of the original image.

Figure 6:
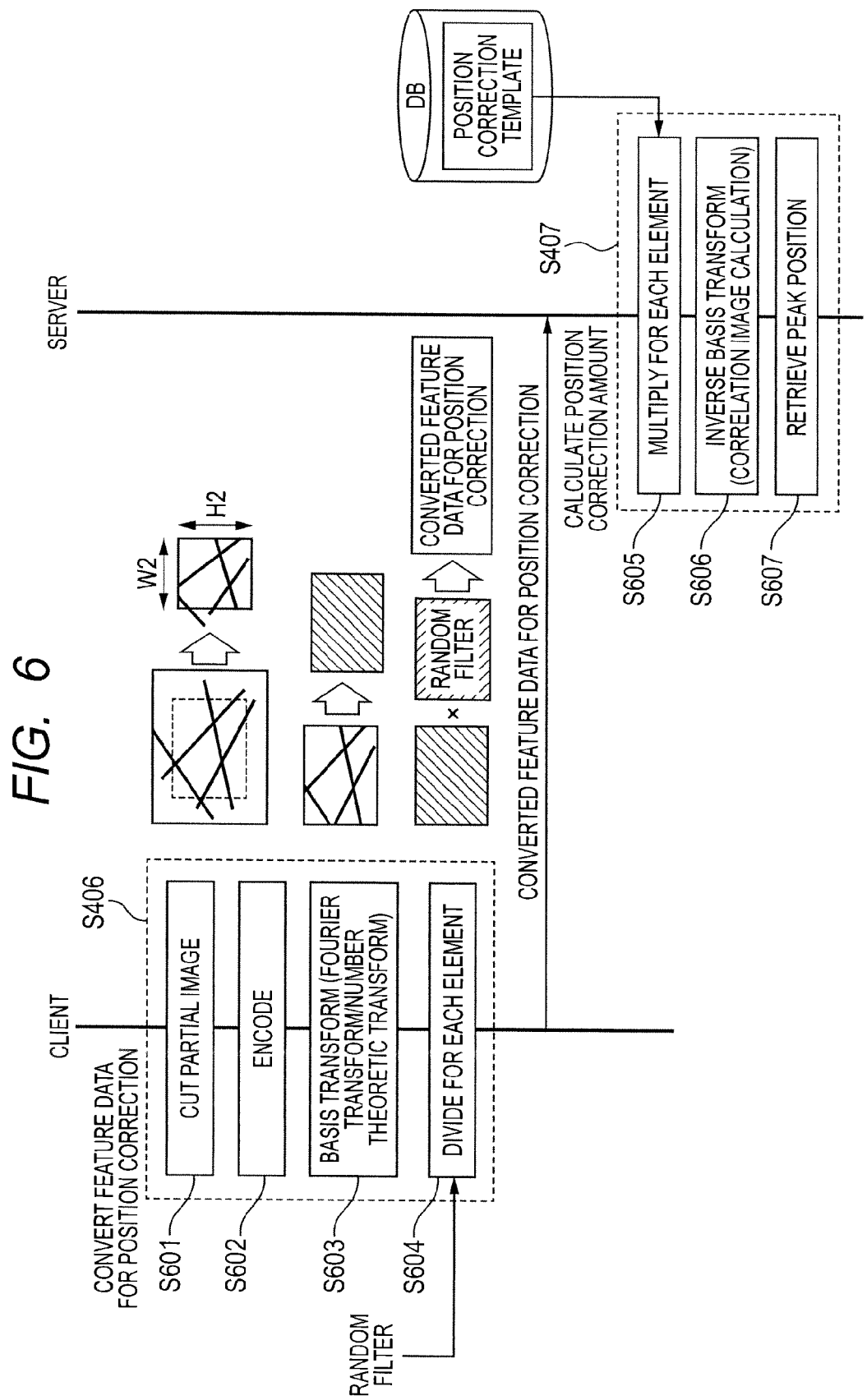
FIG. 6 Flowcharts of a feature-data-conversion-for-position-correction process and a position correction amount calculation process at the authentication time.

FIG. 6 shows detailed flowcharts of the feature data conversion for position correction (S406) and the position correction amount calculation (S407) at the authentication time.

In the feature data conversion for position correction (S406), first, the feature-data-conversion-for-position-correction unit 104 of the client 100 cuts a partial image (partial feature data array for authentication) having a size of W2×H2 from the center of the authentication feature data image (S601).

Next, the values of the pixels of this partial image are encoded (digitized) in accordance with the following rule (S602). The encoded array (partial image) is referred to as the encoded partial feature data array for authentication.

$$1 \rightarrow 1, 0 \rightarrow -1, * \rightarrow 0$$

The encoded partial image is subjected to basis transform (Fourier transform or number theoretic transform) (S603).

An image is generated by dividing the values of the pixels of the basis-transformed image by the values of the corresponding pixels of the random filter generated at the registration time, and the generated image is transmitted to the server 130 as a converted feature data for position correction (S604). Note that the division is an operation between definitions in basis transform (complex number fields in Fourier transform, a prime field Z/pZ, etc. in number theoretic transform).

In the position correction amount calculation (S407), the position correction amount calculation unit 134 of the server 130 multiplies the received converted feature data for position correction and the position correction template read from the database 133 for each corresponding pixel so as to generate a multiplication image (S605).

The generated multiplication image is subjected to inverse basis transform (inverse Fourier transform or inverse number theoretic transform) so as to calculate a correlation image 700 (S606). The correlation image is a correlation function (correlation image, correlation array) (Formula (1)) between the local image cut from the registration feature data (encoded partial feature data array for registration) and the partial image cut from the authentication feature data (encoded partial feature data array for authentication).

Figure 7:
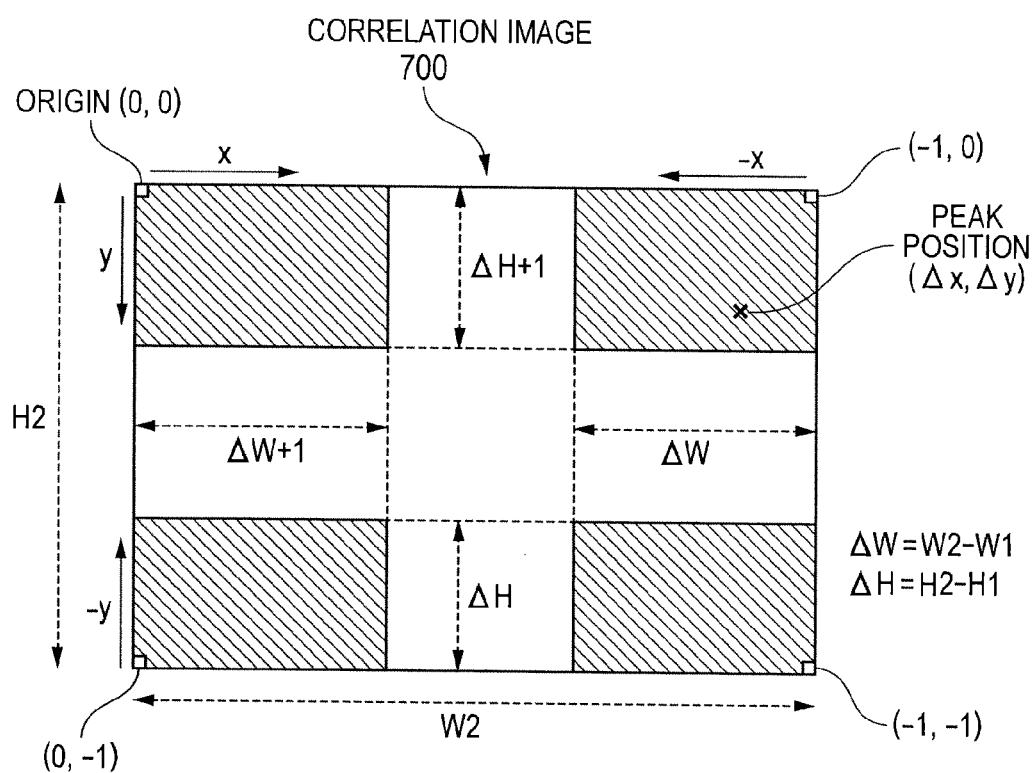
FIG. 7 A schematic diagram of a correlation image.

The position correction amount calculation unit 134 retrieves the peak position (the position of an array element having the largest value) of the correlation from the correlation image 700 (S607). FIG. 7 shows a schematic diagram of the correlation image 700. A correlation image C(x, y) contains the sum (inner product) of values obtained by overlaying the local image cut from the registration feature data on the partial image cut from the authentication feature data with the images displaced from each other by (x, y) and then by performing multiplication for each corresponding pixel. A larger inner product means that the degree of match between the images in the displacement amount (x, y) is higher. A set of coordinates (x, y) on the correlation image is cyclic. It is assumed that in the upper-left area $(\Delta W+1) \times (\Delta H+1)$ of the correlation image 700 is $0<=x<=\Delta W$ and $0<=y<=\Delta H$; in the lower-left area $(\Delta W+1) \times \Delta H$ thereof, $0<=x<=\Delta W$ and $-\Delta H<=y<0$; in the upper-right area $\Delta W \times (\Delta H+1)$ thereof, $-\Delta W<=x<0$ and $0<=y<=\Delta H$; and in the lower-right area $\Delta W \times \Delta H$ thereof, $-\Delta W<=x<0$ and $-\Delta H<=y<0$. The other areas are not referred to. The largest of the values of the pixels (the values of the inner products) in the above-mentioned areas of the correlation image 700 is retrieved, and a set of coordinates (the peak position in the diagram) that achieves the largest value are defined as $(\Delta x, \Delta y)$. If there are multiple sets of coordinates that achieve the largest value, any one of the sets is selected and defined as $(\Delta x, \Delta y)$. $(\Delta x, \Delta y)$ is defined as a position correction amount.

As seen, in this embodiment, the set of coordinates $(\Delta x, \Delta y)$ that achieves the largest value is fed back to the client 100 as a position correction amount. Thus, the client 100 can perform position correction on the feature data with the original feature data concealed from the server 130. Further, according to this embodiment, the client cannot recognize the original registration feature data during the position correction process. This makes it possible to protect against an attack from an unauthorized user of the client to acquire the original registration feature data.

The problem with Patent Document 1 is that the client cannot perform position correction on the feature data; therefore, if there is a displacement between the registration and authentication feature data, the distance cannot be correctly calculated, significantly deteriorating authentication accuracy. This embodiment provides a solution to this problem.

Figure 8:
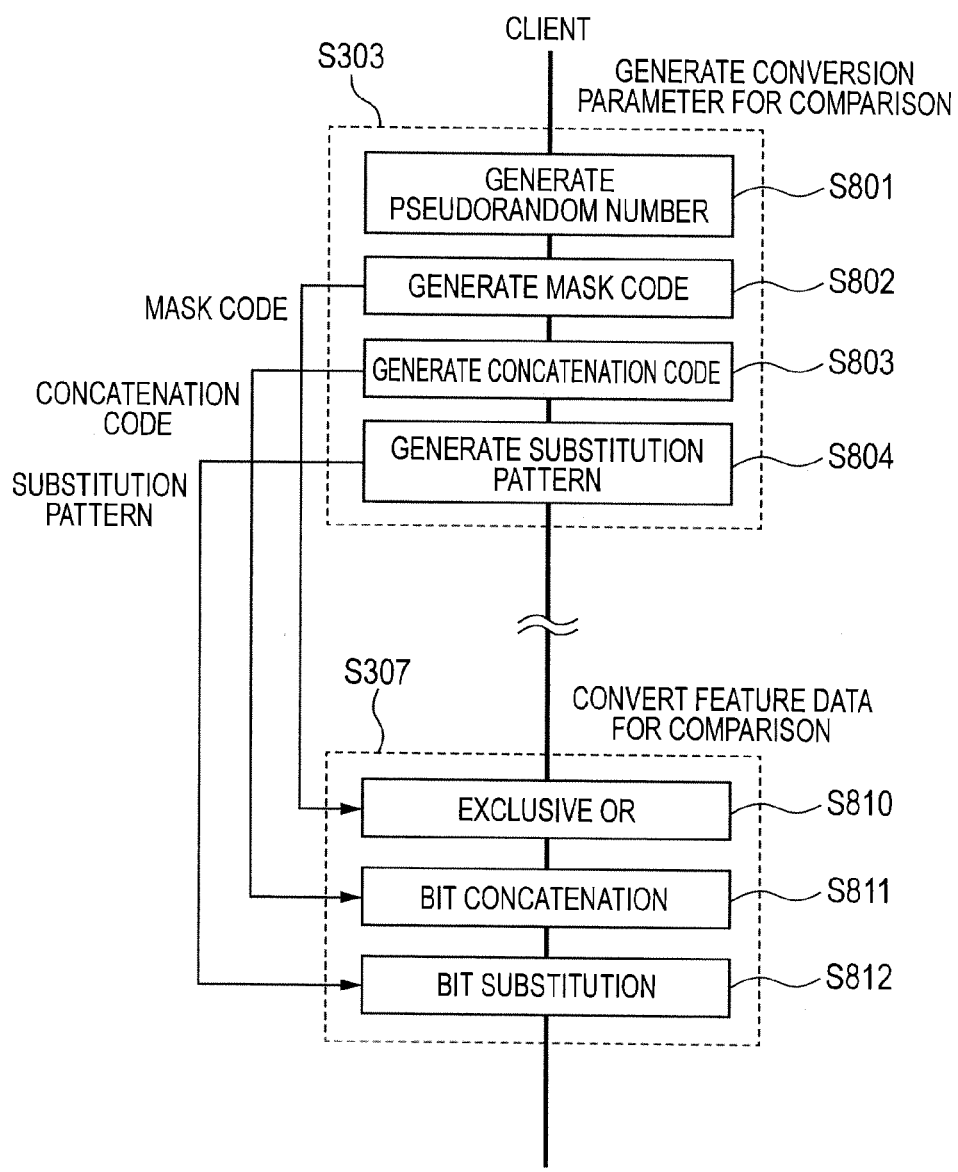
FIG. 8 Flowcharts of a conversion-parameter-for-comparison generation process and a feature-data-conversion-for-comparison process at the registration time.
Figure 10:
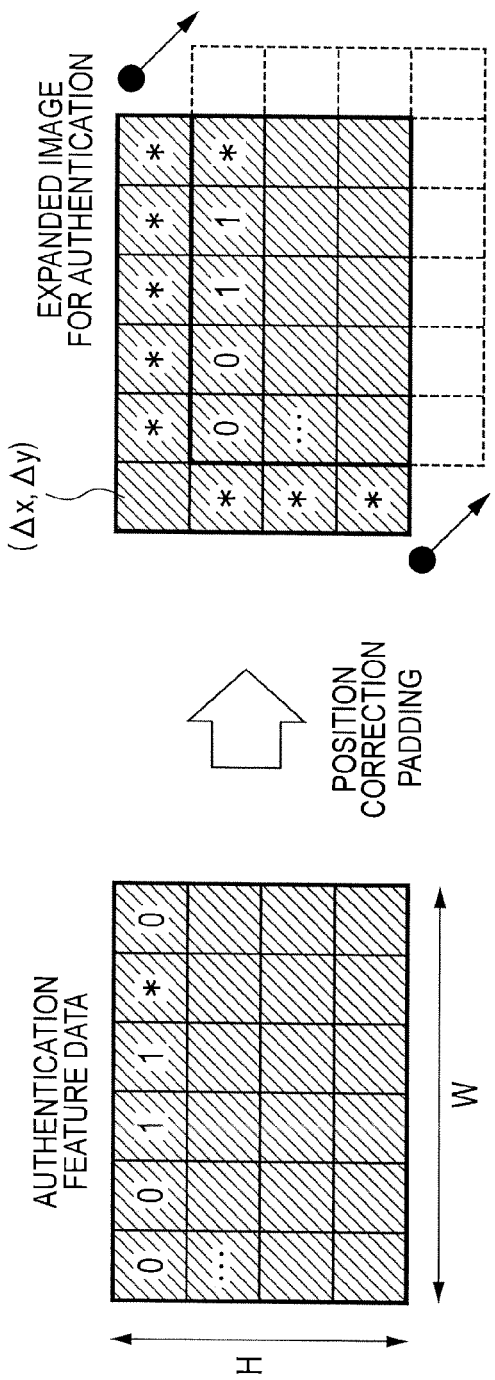
FIG. 10 A drawing showing an authentication feature data position correction and padding process.

FIG. 8 shows detailed flowcharts of the generation of a conversion parameter for comparison (S303) and the feature data conversion for comparison (S307) at the registration time. Further, FIG. 10 shows a process of performing position correction and padding on the authentication feature data. As shown in FIG. 10, the authentication feature data image is represented by an image having a size of W×H (two-dimensional array), and each pixel has a value of any one of (0, 1, *).

In the generation of a conversion parameter for comparison (S303), first, the pseudorandom number generation unit 102 generates a pseudorandom number array (S801).

Next, the conversion-parameter-for-comparison generation unit 105 randomly generates a bit string (mask bit array) having a length of L=W×H (bits) and not including a Don't care bit and defines the bit string as a mask code C1 (S802).

Also, a bit string (concatenation array) having a length of M bits (M>=0 where >= indicates that a value on the left side is equal to or greater than a value on the right side, that is, M is equal to or greater than zero) and including a Don't care bit is randomly generated, and the generated bit string is defined as a concatenation code C2 (S803).

Also, a substitution $\sigma=(\sigma(1), \sigma(2), \ldots, \sigma(N))$ having a length N=L+M is randomly generated, and the substitution is defined as a substitution pattern (S804). The substitution $\sigma$ is any rearrangement (permutation) of a natural number set {1, 2, N} and represents a map where a bit string (array) b=(b(1), b(2), . . . , b(N)) having a length N and a bit string b'=$\sigma$b=(b($\sigma$(1)), b($\sigma$(2)), . . . , b($\sigma$(N))) are associated with each other.

Next, in the feature data conversion for comparison (S307), first, the feature-data-conversion-for-comparison unit 106 calculates the exclusive OR between a registration feature data code X (L bits), which is the bit string form of the registration feature data, and the mask code C1 (S810).

X1=X(+)C1 where "(+)" represents an exclusive OR (XOR). Note that the exclusive OR between any bit and a Don't care bit "*" is always "*". That is, *(+)0=0(+)*=*(+)1=1(+)*=*. (The condition for calculating the exclusive OR of binary logic {0, 1} is: if the values are different, the exclusive OR therebetween is 1; if the values are the same, the exclusive OR therebetween is 0. In addition, if at least one of bits between which the exclusive OR is to be calculated is *, the exclusive OR is *.)

The concatenation code C2 is bit-concatenated to the calculation result, the bit string X1 (S811).

X2=X1||C2 where "||" represents bit concatenation.

The calculation result, a bit string X2 (concatenation array for registration), is subjected to bit substitution using the substitution pattern $\sigma$ (S812).

$$X' = \sigma X2$$

The substituted bit string, X', is used as a comparison template. As seen, according to this embodiment, the registration feature data is subjected to the exclusive OR with the random bit string, concatenation with the random code, and random bit substitution and thus is registered in the server 130 as a comparison template with the original feature data tightly concealed.

Figure 9:
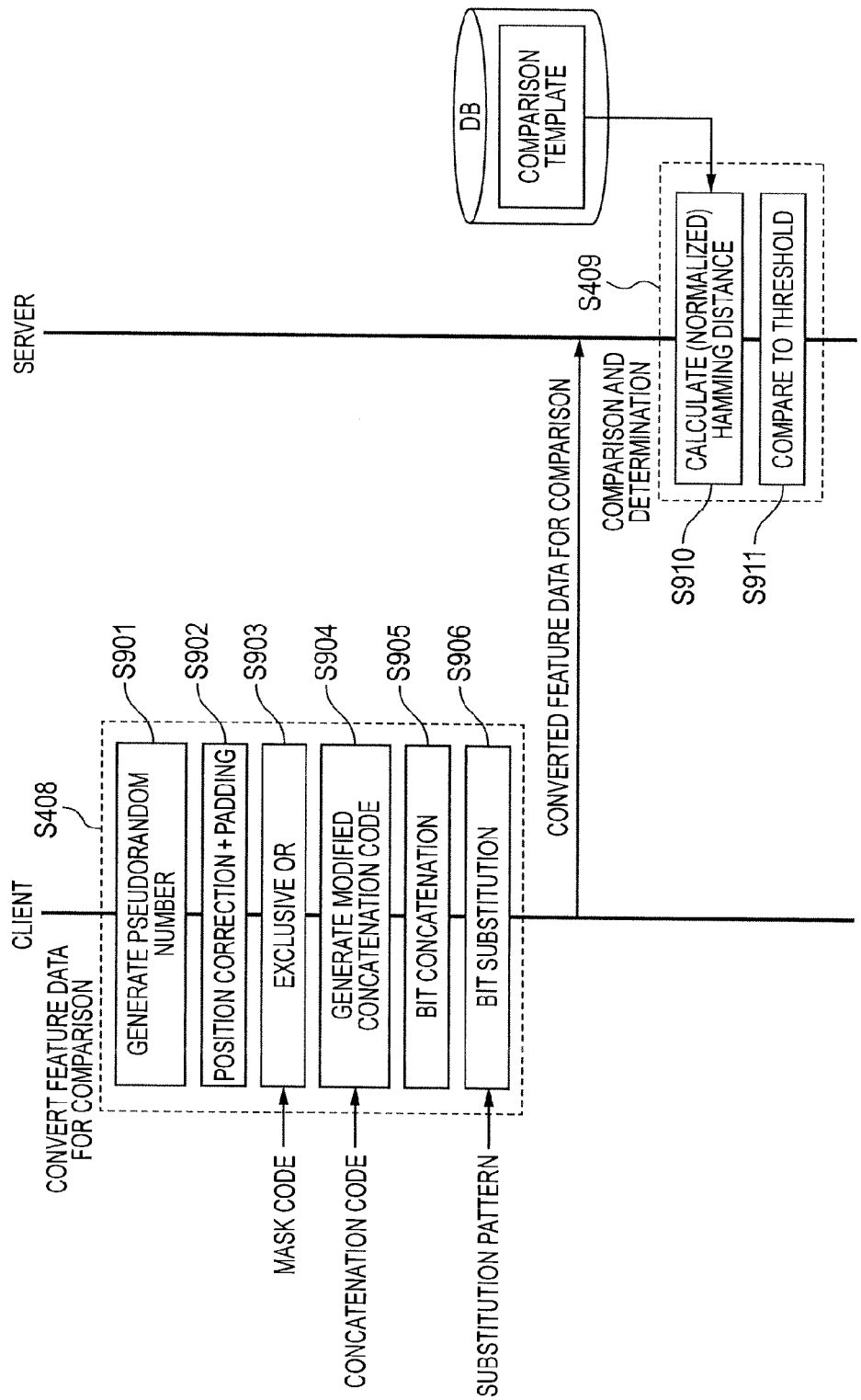
FIG. 9 Flowcharts of a feature-data-conversion-for-position-correction process, a feature-data-conversion-for-comparison process, and comparison and determination process at the authentication time.

FIG. 9 shows detailed flowcharts of the feature data conversion for position correction and comparison (S408) and the comparison and determination (S409) at the authentication time.

In the feature data conversion for position correction and comparison (S408), first, the pseudorandom number generation unit 102 generates a pseudorandom number array (S901).

Next, as shown in FIG. 10, the feature-data-conversion-for-comparison unit 106 shifts the authentication feature data by the position correction amount $(\Delta x, \Delta y)$ and pads the emptied areas with Don't care bits "*" (S902). Note that the areas that lie off the original image area (size W×H) due to the shift are discarded.

The exclusive OR between a corrected feature data code Y (L bits), which is the bit string form of the shifted and padded image (corrected feature data array), and the mask code C1 is calculated (S903).

$$Y1 = Y(+)C1$$

A modified concatenation code C3 (modified concatenation array) distant from the concatenation code C2 by a predetermined Hamming distance δ (<=M) is randomly generated (S904). The modified concatenation code C3 is generated by randomly selecting δ number of hit positions from bit positions of 0 or 1 in the concatenation code C2, inverting bits in the selected bit positions, and replacing all bit positions of * with any bit value of {0, 1, *}.

The modified concatenation code C3 is bit-concatenated to the bit string Y1 (S905).

$$Y2 = Y1 \| C3$$

The calculation result, a bit string Y2 (concatenation array for authentication), is subjected to bit substitution using the substitution pattern σ, and the substituted bit string, Y', is defined as a converted feature data for comparison (S906).

$$Y' = \sigma Y2$$

In the comparison and determination (S409), first, the comparison and determination unit 135 calculates the Hamming distance between the converted feature data Y' for comparison and the comparison template X' and subtracts a predetermined Hamming distance δ from the calculated Hamming distance so as to calculate a distance value d (S910).

$$d = HD(X', Y') - \delta$$

With respect to any bit strings, A and B, the following holds true.

$$HD(A,B) = HW(A(+)B)$$

(HW(C) is the number of bits of "1" (Hamming weight) in a bit string C)

$$HW(\sigma A) = HW(A),$$

$$HW(A \| B) = HW(A) + HW(B)$$

$$\sigma A (+) \sigma B = \sigma(A(+)B)$$

Thus, the following holds true.

$$\begin{aligned}HW(X'(+)Y') &= HW(\sigma((X(+)C1)\|C2)(+)\sigma((Y(+)C1)\|C3))\\ &= HW(\sigma(((X(+)C1)\|C2)(+)\sigma((Y(+)C1)\|C3)))\\ &= HW(((X(+)C1)\|C2)(+)((Y(+)C1)\|C3))\\ &= HW(((X(+)C1)(+)(Y(+)C1))\|(C2(+)C3))\\ &= HW((X(+)C1)(+)(Y(+)C1)) + HW(C2(+)C3)\\ &= HW(X(+)Y) + \delta\end{aligned}$$

As a result, the following holds true.

$$d = HW(X(+)Y) = HD(X,Y)$$

That is, the distance value d is equal to the Hamming distance between the registration feature data X and the authentication feature data Y.

Finally, the comparison and determination unit 135 compares the distance d with a predetermined threshold t. If d<=t, the comparison and determination unit 135 determines that the authentication has succeeded (OK). If d>t, it determines that the authentication has failed (NG) (S911).

Note that, in Non-Patent Document 1, match or mismatch is determined using a normalized Hamming distance d'=d/n where d is the Hamming distance and n is the number of bits of "0" or "1" in Z=X(+)Y.

This embodiment is also applicable to authentication based on the normalized Hamming distance by performing the following calculation.

HW2(C) represents the number of bits of "0" or "1" in the bit string C. The following holds true for any bit strings, A and B.

$$HW2(\sigma A) = HW2(A),$$

$$HW2(A\|B) = HW2(A) + HW2(B)$$

Thus, the following holds true.

$$\begin{aligned}HW2(X'(+)Y') &= HW2(\sigma((X(+)C1)\|C2)(+)\sigma((Y(+)C1)\|C3))\\ &= HW2(\sigma(((X(+)C1)\|C2)(+)((Y(+)C1)\|C3)))\\ &= HW2(((X(+)C1)\|C2)(+)((Y(+)C1)\|C3))\\ &= HW2(((X(+)C1)(+)(Y(+)C1))\|(C2(+)C3))\\ &= HW2((X(+)C1)(+)(Y(+)C1)) + HW2(C2(+)C3)\\ &= HW2(X(+)Y) + HW2(C2)\\ &= n + \delta2 \text{ where } \delta2 = HW2(C2)\end{aligned}$$

Thus, if δ2 is previously calculated and stored in the server 130 along with a template at the registration time, the denominator of the normalized Hamming distance, n, can be calculated as n=HW2(X'(+)Y')−δ2.

As seen above, according to this embodiment, the authentication feature data is subjected to the exclusive OR with the random bit string, concatenation with the random code, and random bit substitution and thus is transmitted to the server 130 as a converted feature data for comparison with the original feature data tightly concealed. In particular, the authentication concatenation code C3 is randomly generated each time authentication is performed. Thus, even if the server malevolently performs an attack to compare converted feature data for comparison in multiple times of authentication of the same user, the server cannot identify the bit position substituted from the concatenation code, that is, a high level of security is realized.

The problem with the method of Patent Document 1 is that since the concatenation code is a fixed code that does not change each time authentication is performed, the bit position substituted from the concatenation code can be identified due to an attack and thus the method does not contribute to an increase in security. This embodiment provides a solution to this problem.

In the method of Patent Document 2, a comparison score is defined on the basis of the correlation value between the feature data. Accordingly, if the method is applied to a conventional authentication algorithm based on the Hamming distance, authentication accuracy may deteriorate. In this embodiment, determination is finally made on the basis of the Hamming distance. Thus, this embodiment is advantageous in that accuracy deterioration is less than that in the method of Patent Document 2.

According to this embodiment, in a client/server-type biometric authentication system using a biometric authentication method where feature data are represented by one-dimensional arrays (bit strings) or two-dimensional arrays (images) including a Don't care bit and where the distance between the feature data is defined as the minimum Hamming distance taking into account a shift (displacement), it is possible to realize cancelable biometric authentication where authentication can be received with authentication accuracy equivalent to that in a conventional biometric authentication method maintained, without the client not having to hold a template, and with the feature data concealed from the server. Thus, in a large-scale biometric authentication system that manages many users, it is possible to safely protect biometric information of the users (and feature data extracted therefrom) even when the information leaks due to a fraud or mistake made by the administrator of the server.

EXPLANATION OF NUMERALS

100: client, 101: feature data extraction unit, 102: pseudorandom number generation unit, 103: conversion-parameter-for-position-correction generation unit, 104: feature-data-conversion-for-position-correction unit, 105: conversion-parameter-for-comparison generation unit, 106: feature-data-conversion-for-comparison unit, 107: recording medium I/F unit, 108: communication unit, 110: sensor, 120: recording medium, 130: server, 131: communication unit, 132: registration unit, 133: database, 134: position correction amount calculation unit, 135: comparison and determination unit, 200: CPU, 201: memory, 202: HDD, 203: input device, 204: output device, 205: communication device, 700: correlation image

The invention claimed is:

1. A biometric authentication method comprising the steps of:
    extracting a feature data array for registration from biometric information of a registration applicant at a biometric information registration time using a client;
    generating a first conversion parameter for comparison at the biometric information registration time using the client, the first conversion parameter for comparison being used to convert the feature data array for registration;
    generating a position correction template from the feature data array for registration at the biometric information registration time using the client;
    generating a comparison template by converting the feature data array for registration using the first conversion parameter for comparison at the biometric information registration time using the client;
    transmitting the position correction template and the comparison template to a server at the biometric information registration time using the client;
    storing using the server the position correction template and the comparison template transmitted by the client in a database coupled to the server;
    extracting a feature data array for authentication from biometric information of a user at an authentication time using the client;
    generating a second conversion parameter for comparison at the authentication time using the client, the second conversion parameter for comparison being used to convert the feature data array for authentication;
    generating converted feature data for position correction from the feature data array for authentication at the authentication time using the client;
    transmitting the converted feature data for position correction to the server at the authentication time using the client;
    calculating a position correction amount between the feature data array for registration and the feature data array for authentication using the position correction template stored in the database and the converted feature data for position correction transmitted by the client using the server;
    transmitting the position correction amount to the client using the server;
    generating a corrected feature data array by performing position correction on the feature data array for authentication on the basis of the position correction amount using the client;
    generating a converted feature data array for comparison by converting the corrected feature data array using the second conversion parameter for comparison using the client;
    transmitting the converted feature data array for comparison to the server using the client;
    calculating the distance between the comparison template stored in a database and the converted feature data array for comparison transmitted by the client using the server; and
    determining success or failure of authentication of the user as the registration applicant on the basis of comparison between the distance and a predetermined authentication threshold using the server,
    wherein the generation of the position correction template includes generating a local feature data array for registration by cutting a part of the feature data array for registration,
    wherein the generation of the converted feature data for position correction includes generating a partial feature data array for authentication by cutting a part of the feature data array for registration,
    wherein in the calculation of the position correction amount, a distance is calculated while the partial feature data array for authentication is repeatedly shifted relative to the local feature data array for registration, and a shift amount with which the distance is minimized is defined as the position correction amount, and
    wherein in the generation of the corrected feature data array, the feature data array for authentication is shifted by the position correction amount.

2. The biometric authentication method according to claim 1,
    wherein the feature data array for registration and the feature data array for authentication are each a bit string having a predetermined size L,
    the generation of the first conversion parameter for comparison includes randomly generating a mask bit string having the size L,
    the first conversion parameter for comparison includes the mask bit string,
    the comparison template is an array obtained by calculating the exclusive OR between the feature data array for registration and the mask bit string,
    the converted feature data array for comparison is an array obtained by calculating the exclusive OR between the corrected feature data array and the mask bit string, and
    the distance is a Hamming distance.

3. The biometric authentication method according to claim 2,
    wherein the feature data array for registration, the corrected feature data array, and the mask bit string are each a bit string containing a Don't care bit "*" that is ignored,
    the exclusive OR between the feature data array for registration and the mask bit string for obtaining the comparison template and the exclusive OR between the corrected feature data array and the mask bit string for obtaining the converted feature data array for comparison are each calculated under a rule that if at least one of bits is a Don't care bit "*", the exclusive OR between the bits is a Don't care bit "*", and the Hamming distance between the comparison template and the converted feature data array for comparison is the number of bits of "1" contained in a bit string obtained by calculating the exclusive OR between the comparison template and the converted feature data array for comparison.

4. The biometric authentication method according to claim 1,
wherein the feature data array for registration and the feature data array for authentication are each a bit string having the predetermined size L,
the generation of the first conversion parameter for comparison includes:
randomly generating a concatenation array having a size M; and
generating a substitution pattern, the substitution pattern being used to substitute positions of elements of an array for each other, the array having a size of the sum of L and M,
the generation of the comparison template includes:
generating a concatenation array for registration having a size of the sum of L and M by concatenating the feature data array for registration and the concatenation array; and
generating the comparison template by substituting the concatenation array for registration in accordance with the substitution pattern,
the generation of the converted feature data array for comparison includes:
generating a modified concatenation array that is distant from the concatenation array by a predetermined offset Hamming distance δ and has the size M;
generating a concatenation array for authentication having the size of the sum of L and M by concatenating the feature data array for authentication and the modified concatenation array; and
generating the converted feature data array for comparison by substituting the concatenation array for authentication in accordance with the substitution pattern,
the calculation of the distance between the comparison template and the converted feature data array for comparison is calculation of a corrected Hamming distance (d−δ) by subtracting the offset Hamming distance δ from the Hamming distance d between the comparison template and the converted feature data array for comparison, and
the distance for determining the success or failure of authentication is the corrected Hamming distance.

5. The biometric authentication method according to claim 1, further comprising the steps of:
generating a conversion parameter for position correction at the biometric information registration time, the conversion parameter for position correction being used to convert the feature data array for registration,
the generation of the position correction template includes:
cutting a local feature data array for registration from the feature data array for registration; and
generating the position correction template by converting the local feature data array for registration using the conversion parameter for position correction, and
the generation of the converted feature data for position correction includes:
cutting a partial feature data array for authentication from the feature data array for authentication; and
generating the converted feature data for position correction by converting the partial feature data array for authentication using the conversion parameter for position correction.

6. The biometric authentication method according to claim 5,
wherein the conversion parameter for position correction is a randomly generated reversible filter,
the conversion of the local feature data array for registration using the conversion parameter for position correction includes:
generating an encoded local feature data array for registration by replacing values 0, 1, and * of elements of the local feature data array for registration with values a, b, and c of any one of predetermined integers and real numbers, where "*" is a Don't care bit "*" that is ignored,
inversely sorting the encoded local feature data array for registration; and
convoluting the filter into the inversely sorted array,
the conversion of the partial feature data array for authentication using the conversion parameter for position correction includes:
generating an encoded partial feature data array for authentication by replacing values 0, 1, and * of elements of the partial feature data array for authentication with values a', b', and c' of any one of predetermined integers and real numbers; and
deconvoluting the filter into the encoded partial feature data array for authentication, and
the calculation of the position correction amount includes:
calculating a correlation array between the encoded partial feature data array for authentication and the encoded partial feature data array for authentication, from the position correction template and the converted feature data for position correction;
retrieving the position of an array element having the largest value in the correlation array; and
determining the position correction amount on the basis of the position.

7. A biometric authentication system comprising:
a client including:
a feature data extraction unit that extracts a feature data array for registration from biometric information of a registration applicant at a biometric information registration time and extracts a feature data array for authentication from biometric information of a user at a authentication time;
a conversion-parameter-for-comparison generation unit that generates a first conversion parameter for comparison by converting the feature data array for registration at the registration time and generates a second conversion parameter for comparison by converting the feature data array for authentication at the authentication time;
a conversion-parameter-for-position-correction generation unit that generates a position correction template by converting the feature data array for registration at the registration time;
a feature-data-conversion-for-position-correction unit that generates converted feature data for position correction from the feature data array for authentication at the authentication time; and
a feature-data-conversion-for-comparison unit that generates a comparison template by converting the feature data array for registration using the first conversion parameter for comparison at the registration time, generates a corrected feature data array by performing position correction on the feature data array for authentication on the basis of a position correction amount at the authentication time, and generates a converted feature data array for comparison by converting the corrected feature data array using the second conversion parameter for comparison; and a server coupled with the client, the server configured to store the position correction template and the comparison template in a database coupled to the server, and further including:

a position correction amount calculation unit that calculates the position correction amount between the feature data array for registration and the feature data array for authentication using the position correction template and the converted feature data for position correction; and a comparison and determination unit that calculates a distance between the comparison template and the converted feature data array for comparison and determines success or failure of authentication of the user as the registration applicant on the basis of comparison between the distance and a predetermined authentication threshold, wherein the generation of the position correction template by the feature-data-conversion-for-position-correction unit includes generating a local feature data array for registration by cutting a part of the feature data array for registration, wherein the generation of the converted feature data for position correction by the feature-data-conversion-for-position-correction unit includes generating a partial feature data array for authentication by cutting a part of the feature data array for authentication, wherein in the calculation of the position correction amount by the position correction amount calculation unit, a distance is calculated while the partial feature data array for authentication is repeatedly shifted relative to the local feature data array for registration, and a shift amount with which the distance is minimized is defined as the position correction amount, and wherein in the generation of the corrected feature data array, the feature data array for authentication is shifted by the position correction amount.

8. The biometric authentication system according to claim 7, wherein the feature data array for registration and the feature data array for authentication are each a bit string having a predetermined size L, the first conversion parameter for comparison generated by the conversion-parameter-for-comparison generation unit includes a random mask bit string having the size L, the comparison template is an array obtained by calculating the exclusive OR between the feature data array for registration and the mask bit string, the converted feature data array for comparison is an array obtained by calculating the exclusive OR between the corrected feature data array and the mask bit string, and the distance is a Hamming distance.

9. The biometric authentication system according to claim 8, wherein the feature data array for registration, the corrected feature data array, and the mask bit string are each a bit string containing a Don't care bit "*" that is ignored, the exclusive OR between the feature data array for registration and the mask bit string for obtaining the comparison template and the exclusive OR between the corrected feature data array and the mask bit string for obtaining the converted feature data array for comparison are each calculated under a rule that if at least one of bits is a Don't care bit "*", the exclusive OR between the bits is a Don't care bit "*", and the Hamming distance between the comparison template and the converted feature data array for comparison is the number of bits of "1" contained in a bit string obtained by calculating the exclusive OR between the comparison template and the converted feature data array for comparison.

10. The biometric authentication system according to claim 7, wherein the feature data array for registration and the feature data array for authentication are each a bit string having the predetermined size L, the generation of the first conversion parameter for comparison by the conversion-parameter-for-comparison generation unit includes:

randomly generating a concatenation array having a size M; and generating a substitution pattern, the substitution pattern being used to substitute positions of elements of an array for each other, the array having a size of the sum of L and M, the generation of the comparison template by the feature-data-conversion-for-comparison unit includes:

generating a concatenation array for registration having a size of the sum of L and M by concatenating the feature data array for registration and the concatenation array; and generating the comparison template by substituting the concatenation array for registration in accordance with the substitution pattern, the generation of the converted feature data array for comparison by the feature data-conversion-for-comparison unit includes:

generating a modified concatenation array that is distant from the concatenation array by a predetermined offset Hamming distance δ and has the size M;

generating a concatenation array for authentication having the size of the sum of L and M by concatenating the feature data array for authentication and the modified concatenation array; and generating the converted feature data array for comparison by substituting the concatenation array for authentication in accordance with the substitution pattern, the calculation of the distance between the comparison template and the converted feature data array for comparison by the position correction amount calculation unit is calculation of a corrected Hamming distance (d−δ) by subtracting the offset Hamming distance δ from the Hamming distance d between the comparison template and the converted feature data array for comparison, and the distance for determination of the success or failure of authentication by the comparison and determination unit is the corrected Hamming distance.

11. The biometric authentication system according to claim 7, wherein the conversion-parameter-for-position-correction generation unit generates a conversion parameter for position correction at the registration time, the conversion parameter for position correction being used to convert the feature data array for registration, the generation of the position correction template by the conversion-parameter-for-position-correction generation unit includes:
cutting a local feature data array for registration from the feature data array for registration; and
generating the position correction template by converting the local feature data array for registration using the conversion parameter for position correction, and
the generation of the converted feature data for position correction by the feature-data-conversion-for-position-correction unit includes:
cutting a partial feature data array for authentication from the feature data array for authentication; and
generating the converted feature data for position correction by converting the partial feature data array for authentication using the conversion parameter for position correction.

12. The biometric authentication system according to claim 11,
wherein the conversion parameter for position correction is a randomly generated reversible filter,
the conversion of the local feature data array for registration using the conversion parameter for position correction includes:
generating an encoded local feature data array for registration by replacing values 0, 1, and * of elements of the local feature data array for registration with values a, b, and c of any one of predetermined integers and real numbers, where "*" is a Don't care bit "*" that is ignored,
inversely sorting the encoded local feature data array for registration; and
convoluting the filter into the inversely sorted array,
the conversion of the partial feature data array for authentication using the conversion parameter for position correction includes:
generating an encoded partial feature data array for authentication by replacing values 0, 1, and * of elements of the partial feature data array for authentication with values a', b', and c' of any one of predetermined integers or real numbers; and
deconvoluting the filter into the encoded partial feature data array for authentication, and
the calculation of the position correction amount includes:
calculating a correlation array between the encoded partial feature data array for registration and the encoded partial feature data array for authentication, from the position correction template and the converted feature data for position correction;
retrieving the position of an array element having the largest value in the correlation array; and
determining the position correction amount on the basis of the position.

13. A biometric authentication system comprising:
a registration client including:
a first feature data extraction unit that extracts a feature data array for registration from biometric information of a registration applicant at a biometric information registration time;
a first conversion-parameter-for-comparison generation unit that generates a first conversion parameter for comparison, the first conversion parameter for comparison being used to convert the feature data array for registration;
a conversion-parameter-for-position-correction generation unit that generates a position correction template by converting the feature data array for registration; and
a first feature-data-conversion-for-comparison unit that generates a comparison template by converting the feature data array for registration using the first conversion parameter for comparison;
an authentication client including:
a second feature data extraction unit that extracts a feature data array for authentication from biometric information of a user at an authentication time;
a second conversion-parameter-for-comparison generation unit that generates a second conversion parameter for comparison, the second conversion parameter for comparison being used to convert the feature data array for authentication;
a feature-data-conversion-for-position-correction unit that generates converted feature data for position correction from the feature data array for authentication; and
a second feature-data-conversion-for-comparison unit that generates a corrected feature data array by performing position correction on the feature data array for authentication on the basis of the position correction amount and generates a converted feature data array for comparison by converting the corrected feature data array using the second conversion parameter for comparison; and
a server coupled with the registration and authentication clients, the server configured to store the position correction template and the comparison template in a database coupled to the server and further including:
a position correction amount calculation unit that calculates the position correction amount between the feature data array for registration and the feature data array for authentication using the position correction template and the converted feature data for position correction; and
comparison and determination unit that calculates a distance between the comparison template and the converted feature data array for comparison and determines success or failure of authentication of the user as the registration applicant on the basis of comparison between the distance and a predetermined authentication threshold,
wherein the generation of the position correction template by the feature-data-conversion-for-position-correction unit includes generating a local feature data array for registration by cutting a part of the feature data array for registration,
wherein the generation of the converted feature data for position correction by the feature-data-conversion-for-position-correction unit includes generating a partial feature data array for authentication by cutting a part of the feature data array for authentication,
wherein in the calculation of the position correction amount by the position correction amount calculation unit, a distance is calculated while the partial feature data array for authentication is repeatedly shifted relative to the local feature data array for registration, and a shift amount with which the distance is minimized is defined as the position correction amount, and
wherein in the generation of the corrected feature data array, the feature data array for authentication is shifted by the position correction amount.

14. The biometric authentication system according to claim 13,
wherein the feature data array for registration and the feature data array for authentication are each a bit string having a predetermined size L,
the first conversion parameter for comparison generated by the first conversion-parameter-for-comparison generation unit includes a random mask bit string having the size L,
the comparison template is an array obtained by calculating the exclusive OR between the feature data array for registration and the mask bit string,
the converted feature data array for comparison is an array obtained by calculating the exclusive OR between the corrected feature data array and the mask bit string, and
the distance is a Hamming distance.

15. The biometric authentication system according to claim 14,
wherein the feature data array for registration, the corrected feature data array, and the mask bit string are each a bit string containing a Don't care bit "*" that is ignored,
the exclusive OR between the feature data array for registration and the mask bit string for obtaining the comparison template and the exclusive OR between the corrected feature data array and the mask bit string for obtaining the converted feature data array for comparison are each calculated under a rule that if at least one of bits is a Don't care bit "*", the exclusive OR between the bits is a Don't care bit "*", and
the Hamming distance between the comparison template and the converted feature data array for comparison is the number of bits of "1" contained in a bit string obtained by calculating the exclusive OR between the comparison template and the converted feature data array for comparison.

16. The biometric authentication system according to claim 13,
wherein the feature data array for registration and the feature data array for authentication are each a bit string having the predetermined size L,
the generation of the first conversion parameter for comparison by the first conversion-parameter-for-comparison generation unit includes:
randomly generating a concatenation array having a size M; and
generating a substitution pattern,
substitution pattern being used to substitute the positions of elements of an array for each other, the array having a size of the sum of L and M,
the generation of the comparison template by the first feature-data-conversion-for-comparison unit includes:
generating a concatenation array for registration having a size of the sum of L and M by concatenating the feature data array for registration and the concatenation array; and
generating the comparison template by substituting the concatenation array for registration in accordance with the substitution pattern,
the generation of the converted feature data array for comparison by the second feature-data-conversion-for-comparison unit includes:
generating a modified concatenation array that is distant from the concatenation array by a predetermined offset Hamming distance δ and has the size M;
generating a concatenation array for authentication having a size of the sum of L and M by concatenating the feature data array for authentication and the modified concatenation array; and
generating the converted feature data array for comparison by substituting the concatenation array for authentication in accordance with the substitution pattern,
the calculation of the distance between the comparison template and the converted feature data array for comparison by the position correction amount calculation unit is calculation of a corrected Hamming distance (d−δ) by subtracting the offset Hamming distance δ from the Hamming distance d between the comparison template and the converted feature data array for comparison, and
the distance for the determination of the success or failure of authentication by the comparison and determination unit is the corrected Hamming distance.

17. The biometric authentication system according to claim 13,
wherein the conversion-parameter-for-position-correction generation unit generates a conversion parameter for position correction at the registration time, the conversion parameter for position correction being used to convert the feature data array for registration,
the generation of the position correction template by the conversion-parameter-for-position-correction generation unit includes:
cutting a local feature data array for registration from the feature data array for registration; and
generating the position correction template by converting the local feature data array for registration using the conversion parameter for position correction, and
the generation of the converted feature data for position correction by the feature-data-conversion-for-position-correction unit includes:
cutting a partial feature data array for authentication from the feature data array for authentication; and
generating the converted feature data for position correction by converting the partial feature data array for authentication using the conversion parameter for position correction.

18. The biometric authentication system according to claim 17,
wherein the conversion parameter for position correction is a randomly generated reversible filter,
the conversion of the local feature data array for registration using the conversion parameter for position correction includes:
generating an encoded local feature data array for registration by replacing values 0, 1, and * of elements of the local feature data array for registration with values a, b, and c of any one of predetermined integers or real numbers, where "*" is a Don't care bit "*" that is ignored,
inversely sorting the encoded local feature data array for registration; and
convoluting the filter into the inversely sorted array,
the conversion of the partial feature data array for authentication using the conversion parameter for position correction includes:
generating an encoded partial feature data array for authentication by replacing values 0, 1, and * of elements of the partial feature data array for authentication with values a', b', and c' of any one of predetermined integers or real numbers; and deconvoluting the filter into the encoded partial feature data array for authentication, and the calculation of the position correction amount includes:
calculating a correlation array between the encoded partial feature data array for registration and the encoded partial feature data array for authentication, from the position correction template and the converted feature data for position correction;
retrieving the position of an array element having the largest value in the correlation array; and
determining the position correction amount on the basis of the position.

\* \* \* \* \*